Nov. 1, 1927.
L. W. JONES
TOOL HOLDER
Filed Sept. 10, 1926
1,647,831
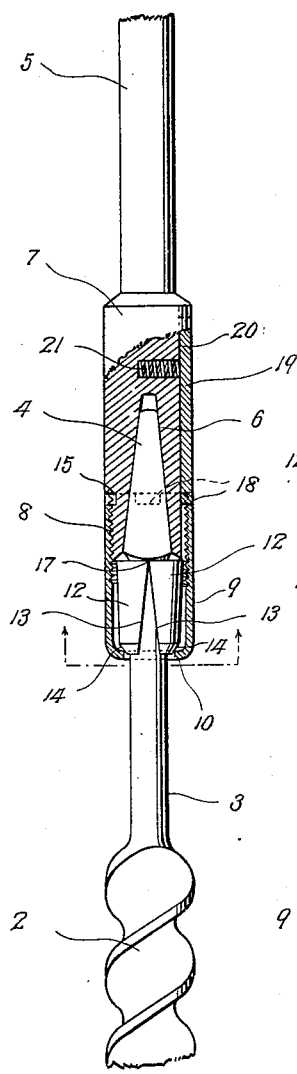
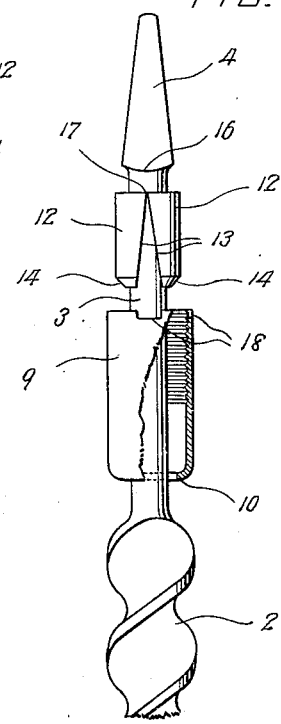
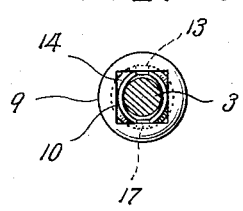
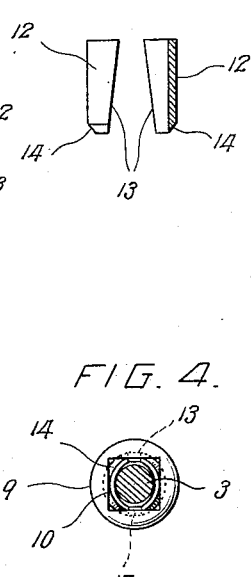
Inventor
Louis W. Jones
By John S. Barker
Attorney Patented Nov. 1, 1927.

1,647,831

UNITED STATES PATENT OFFICE.

LOUIS W. JONES, OF NEW YORK, N. Y., ASSIGNOR TO L. W. JONES TOOL COMPANY, A CORPORATION OF NEW YORK.

TOOL HOLDER.

Substitute for application Serial No. 621,602, filed February 27, 1923. This application filed September 10, 1926. Serial No. 134,706.

My invention relates to tool holders and bit stocks and is particularly adapted for use in connection with extension bit holders such as are used by installing electricians in making openings through walls for electric conductors and conduits. These tools frequently have to be used in inaccessible places, requiring employment of either an excessively long tool or else of a long tool holder. The auger or bit being used sometimes becomes fast in the hole being bored, making it difficult to extract it and tending to cause disengagement of the parts employed to clamp the tool in the holder.

My invention has for its object to provide a holder for a boring or other tool which shall be adapted to follow the hole produced by the tool, that will so secure the tool in the holder that it shall be turned when in use, either to advance or retract it, and that will be of such construction that the parts will not catch or bind in the opening in which the tool and holder are working, all of which will be set forth in the following specification, and is illustrated in the accompanying drawings, in which—

Fig. 1 is an elevation with parts broken away, showing my invention applied to a holder for auger or wood-boring tool, the parts being assembled and in working relationship.

Fig. 2 is a view similar to Fig. 1 except that the parts are separated from each other.

Fig. 3 is a detail elevation of the clamping jaws employed to engage with the shank of the tool.

Fig. 4 is a sectional view on the line IV—IV, Fig. 1.

Referring to the drawings, 2 indicates the tool, in this instance a wood-boring auger. It is formed with the usual shank 3 and a tapering head 4, angular in cross section. 5 designates a tool holder, for instance, an extension holder having a long stem, in the end. 7, of which is formed a socket 6 for the head of the tool. The forward end portion of the socket of the tool holder is reduced in diameter and externally screw-threaded as represented at 8, with which a sleeve 9, preferably of the same diameter as the main portion of the socket 7, is adapted to engage. The outer end of the sleeve 9 is formed with an inturned flange 10 surrounding the opening at this end of the sleeve, which opening is preferably of a size and shape to permit the sleeve to pass over the angular head 4 of the tool.

12, 12 indicate a pair of clamping jaws adapted to encircle the stem 3 of the tool and to lie inside the sleeve 9. Each jaw is a shell of approximately semi-cylindrical shape in cross section, with its edges beveled, as indicated at 13, so that when the two jaws are brought together with their edges at the bases of the shell in contact as indicated at 17, in Fig. 2, there are tapering spaces between such edges 13 extending from the base to the outer end. The outer ends of the shell 12 are exteriorly beveled circumferentially, as indicated at 14.

The parts thus far described are assembled and used as follows: The sleeve 9 is slipped over the head 4 of the tool, its flanged end being toward the auger and the internally screw-threaded end toward the head 4. The jaws or clamping shells 12 are now dropped into the sleeve from its inner end with their beveled ends 14 toward the flanged end 10. The head of the tool is then inserted into the socket 6 of the tool holder and the sleeve is screwed onto the threaded end 8 thereof. Just before the sleeve comes to position, with its inner end in engagement with the shoulder 15 at the base of the reduced screw-threaded part 8, the inner ends of the clamping jaws 12 engage with the shoulder 16 at the base of the head 4, by which the further inward movement is arrested while the sleeve completes its advance to its final seated position. The relative movement between the sleeve and clamping jaws causes the forward beveled ends of the latter to engage with the inturned flange 10 at the outer end of the sleeve, which flange causes the sleeves to rock upon their fulcral bearing engagement points 17, this being permitted by reason of the edges of the jaws being beveled as at 13, until the outer ends of the jaws approach each other sufficiently to tightly clamp the stem 3 of the tool some distance in advance of the head 4. This gives a very firm support for the tool in the holder, a support formed not only by the engagement of the head thereof with the walls of the socket in the tool holder, but by reason of the engagement of the clamping jaws with the stem of the tool considerably in advance of the tool head.

When the parts are thus assembled, as indicated in Fig. 1, the clamped jaws are entirely concealed and protected by the sleeve 9, and there are no angular parts or projections of the holder exposed so as to come into engagement with the walls of the hole into which the tool and holder may enter. This very much reduces the danger of the sleeve being unscrewed, and hence the connection of the tool and holder loosened, as the tool is being withdrawn from a hole. As a matter of safety and to further insure against all possibility of the sleeve becoming disengaged from the holder when in use, I provide means for positively locking the sleeve, which I will now describe. The inner edge of the sleeve is notched, as indicated at 18, in order to receive a slide bar 19 seated in a shallow longitudinal slot 20 in the portion 7 of the tool holder. After the sleeve has been screwed to its seat the slide bar 19 is moved forward until its end enters one of the notches 18, where it will be held by a spring 21 seated in the tool holder and arranged to bear against the slide bar. This arrangement makes it impossible to separate the tool-holding parts so long as the slide bar is in engagement with the sleeve.

I do not limit myself to the exact embodiment of my invention shown in the drawings and described herein, as it is to be understood that various changes, within the scope of the appended claims, may be made without departing from the spirit of my invention.

This case is filed as a substitute for my application filed Feb. 27, 1923, Serial Number 621,602, which became abandoned.

What I claim is:

1. The combination with a tool having a headed shank, of a holder formed with a socket to receive the shank of the tool, the socketed portion of the tool holder being externally screw-threaded at its end, a sleeve adapted to fit over the stem of the tool and engage with the screw-threaded end of the tool holder, and loose clamping jaws within the sleeve arranged to engage with the stem of the tool in advance of the head thereof and of the socket in the holder, the jaws being substantially semi-cylindrical in shape with their edges beveled, and arranged, when brought together within the sleeve and surrounding the stem of the tool, to have their edges abut at their inner ends forming fulcral bearings, the sleeve being shaped to engage with the outer ends of the jaws, and cause them to rock about their fulcral bearings so as to cause their forward ends to engage with the stem of the tool.

2. The combination with a tool having a headed shank, of a holder formed with a socket to receive the shank of the tool, the socketed portion of the tool holder being externally screw-threaded at its end, a sleeve which fits over the stem of the tool and extends beyond the socket portion thereof and whose inner end engages with the screw-threaded end of the tool holder, the outer end of the sleeve being formed with an inturned flange, and loose clamping jaws within the sleeve to engage with the stem of the tool, located beyond the head of the tool shank, and also beyond the socket portion of the tool holder, and each substantially semi-cylindrical in shape and with beveled edges, so that when brought together within the sleeve and surrounding the stem of the tool, their edges abut at their inner ends forming fulcral bearings, the outer ends of the jaws being beveled circumferentially, whereby when the sleeve is screwed to the threaded end of the tool holder the jaws are first thereby forced into engagement with the shank of the tool and are then caused to rock about the fulcral bearings by reason of the engagement of the flanged end of the sleeve with the beveled ends of the jaws and to engage with the stem of the tool considerably in advance of the head thereof.

3. The combination with a tool having a headed angular shank, of a holder formed with a socket to receive the shank, the end of the socketed portion of the tool holder being reduced in diameter and externally screw-threaded forming a shoulder at the base of the screw-threaded part, a sleeve adapted to fit over the end of the tool and engage with the screw-threaded portion of the tool holder, the outer end of the sleeve being provided with an inturned flange, and loose clamping jaws within the sleeve arranged to engage with the stem of the tool in advance of the socket in the holder, the jaws being each substantially semi-cylindrical in shape and with beveled longitudinal edges arranged so that when the jaws are brought together within the sleeve surrounding the stem of the tool their edges abut at their inner ends forming fulcral bearings, and the jaws being circumferentially beveled at their ends, these parts being arranged as described, whereby as the inner end of the sleeve approaches the shoulder at the base of the screw-threaded part of the tool holder, the inner ends of the jaws come into engagement with the shank of the tool and are thereby arrested from longitudinal movement, and the flange at the outer end of the sleeve engages with the beveled ends of the jaws, forcing them toward each other into holding engagement with the stem of the tool in advance of the shank thereof.

LOUIS W. JONES.